US011357177B2

(12) United States Patent
Aposhian et al.

(10) Patent No.: US 11,357,177 B2
(45) Date of Patent: Jun. 14, 2022

(54) SOD HARVESTER HYDRAULIC SYSTEM FOR ACTUATING COMPONENTS WITH PRECISE TIMING

(71) Applicant: FireFly Automatix, Inc., North Salt Lake, UT (US)

(72) Inventors: Steven R. Aposhian, Farmington, UT (US); Eric E. Aston, Farmington, UT (US); William M. Decker, Salt Lake City, UT (US); Samuel H. Drake, Cottonwood Heights, UT (US)

(73) Assignee: FireFly Automatix, Inc., North Salt Lake, UT (US)

( * ) Notice: Subject to any disclaimer, the term of this patent is extended or adjusted under 35 U.S.C. 154(b) by 512 days.

(21) Appl. No.: 15/668,582

(22) Filed: Aug. 3, 2017

(65) Prior Publication Data

US 2019/0037759 A1    Feb. 7, 2019

(51) Int. Cl.
*A01G 20/15*    (2018.01)
*F15B 11/16*    (2006.01)
*F15B 13/06*    (2006.01)
*F15B 13/02*    (2006.01)

(52) U.S. Cl.
CPC .............. *A01G 20/15* (2018.02); *F15B 11/16* (2013.01); *F15B 13/027* (2013.01); *F15B 13/06* (2013.01); *F15B 2211/45* (2013.01); *F15B 2211/71* (2013.01)

(58) Field of Classification Search
CPC ....... A01G 20/15; F15B 11/16; F15B 13/027; F15B 13/06; F15B 2211/45; F15B 2211/71

USPC .......................................................... 172/19
See application file for complete search history.

(56) References Cited

U.S. PATENT DOCUMENTS

| | | | | |
|---|---|---|---|---|
| 2,405,980 A | * | 8/1946 | Sands et al. ........... | B60D 1/465 172/11 |
| 4,466,461 A | * | 8/1984 | Weiss ........................ | F16K 3/34 137/625.3 |
| 4,966,239 A | * | 10/1990 | Hutchison ............... | A01G 20/15 172/20 |
| 5,946,911 A | * | 9/1999 | Buschur et al. ......... | B62D 5/07 60/424 |
| 6,112,680 A | * | 9/2000 | Hummer ................ | A01G 20/15 111/200 |
| 6,223,830 B1 | * | 5/2001 | deVries .................. | A01G 20/12 172/19 |
| 6,988,363 B2 | * | 1/2006 | Bitter ...................... | B66F 9/065 60/468 |

(Continued)

*Primary Examiner* — Thomas B Will
*Assistant Examiner* — Joel F. Mitchell
(74) *Attorney, Agent, or Firm* — Kirton McConkie; Brian Tucker

(57) ABSTRACT

Sod harvesters can have hydraulic systems that are configured to actuate components with precise timing. The hydraulic system of a sod harvester can be configured to maintain the temperature of hydraulic fluid both during harvesting and while harvesting is paused to thereby eliminate or minimize the occurrence of periods of variation in the timing of actuation of the components that the hydraulic fluid drives. As a result, these components can be consistently actuated with precise timing even after harvesting has been paused. Additionally, such configurations can minimize the amount of time required to warm the hydraulic fluid to a steady operational temperature.

20 Claims, 11 Drawing Sheets

(56) References Cited

U.S. PATENT DOCUMENTS

| | | | |
|---|---|---|---|
| 7,066,277 B2 * | 6/2006 | Hendriks et al. | A01G 20/15 172/19 |
| 7,559,197 B2 * | 7/2009 | Verkuilen | E02F 9/2242 60/421 |
| 8,118,112 B2 * | 2/2012 | Juvonen | E02F 9/221 173/1 |
| 9,803,665 B2 * | 10/2017 | Beschorner et al. | E02F 9/2292 |
| 2013/0168073 A1 * | 7/2013 | Dean et al. | F15B 21/042 165/286 |

* cited by examiner

SOD HARVESTER HYDRAULIC SYSTEM FOR ACTUATING COMPONENTS WITH PRECISE TIMING

CROSS-REFERENCE TO RELATED APPLICATIONS

N/A

BACKGROUND

Turf grass (sod) is a living organism that must be handled properly to ensure its survival when it is removed from one location and transplanted to another. Sod is generally harvested using large machinery that cuts slabs of sod from the soil. Typically, a sod harvester employs one or more inclined conveyors to elevate the sod from the ground to a horizontal conveyor. A stacking head is then used to pick up the sod from the horizontal conveyor and stack it on a pallet.

Two general types of harvesters exist: slab harvesters; and roll harvesters. A roll harvester forms the slabs of sod into rolls which are then accumulated on the horizontal conveyor for pick up. A slab harvester, on the other hand, directly stacks the slabs in their flat form. FIG. 7 provides an example of various components of a harvester 700 including a chopping blade 701, a cutting blade 702, an inclined conveyor 703, a stacking conveyor 704 and a stacking head 705. These components operate to severe slabs of sod 720 from the ground 710 and then stack them on a pallet (not shown).

It is typically desirable to maximize the rate at which sod is harvested. At the same time, it is critical that the sod be harvested consistently. However, as the rates of harvesting increase, it becomes very difficult to maintain consistency. For example, a primary factor that limits the rate of harvesting sod is the rate that the stacking head can remove sod from the stacking conveyor. In simple terms, the sod harvester cannot cut sod faster than it can pick it up and stack it. To perform a stacking operation, the stacking head first grabs the sod, elevates it from the stacking conveyor, travels to the pallet, and releases the sod. If the timing of the pick up operation is not precise, the stack of sod on the pallet may not be uniform (which may lead to the stack tipping over) or the stacking head may entirely miss the sod (which would typically result in the sod being discharged off the end of the stacking conveyor). In a worst case scenario, a deviation in the timing of a pick up operation could result in damage to the stacking conveyor (e.g., the stacking head may grab a portion of the stacking conveyor rather than the slabs of sod).

Similar timing issues exist with other portions of a sod harvester. For example, the length of the slabs that are cut from the ground is typically dictated by the actuation of a chopping blade (e.g., chopping blade 701 of FIG. 7). If the timing of this actuation is not precise, the slabs may be longer or shorter than desired. Also, many sod harvesters are designed to move at least a portion of or alter the shape of the stacking conveyor during the pick up operation. For example, U.S. Pat. No. 8,851,278 describes various techniques for moving or changing the shape of the stacking conveyor. FIG. 8 provides one example where a stacking conveyor 800 includes an actuator 801 that alters the orientation of a stacking conveyor adjusting component 802 to thereby change the shape of stacking conveyor 800. If the timing of this movement or change in shape is imprecise, the pick up operation may fail in the manners described above.

Many of these variations in the timing of the various operations are due to variations in the temperature of the hydraulic fluid that drives the components that perform the operations. For example, FIG. 1 illustrates a stacking head 100 that employs hooks 150 to remove the slabs of sod from the stacking conveyor for stacking. These hooks or other similar structures are typically driven by hydraulics (e.g., actuators 102a, 102b which may be either linear or rotary actuators) and therefore the timing of their actuation is oftentimes dependent on the temperature of the hydraulic fluid.

When the hydraulic fluid is cold, the amount of time it takes for the hooks to actuate (i.e., the time between the signal to operate the hydraulic valve that controls the hooks and the completion of the movement of the hooks) is increased relative to when the hydraulic fluid is warm. It is therefore common to let a sod harvester operate (without harvesting sod) for some time to allow the hydraulic fluid to warm up to a steady temperature. With the hydraulic fluid at a steady state, the sod harvester may be "tuned" so that the various operations (e.g., the actuation of hooks or other structures for securing the sod during a pick up operation, the actuation of a chopping blade, or the actuation of components of the stacking conveyor which lift or change the shape of the stacking conveyor) are performed at the proper time. As long as the harvester remains operating (e.g., as long as the stacking operation continues to be periodically performed), the hydraulic fluid may remain at this steady temperature. However, if harvesting is paused even for a relatively short amount of time, the temperature of the hydraulic fluid will likely decrease which will either require retuning the timing of the operations or waiting until the hydraulic fluid has again returned to the steady temperature. In either case, the variations in the temperature of the hydraulic fluid cause significant downtime. In colder environments, the occurrence of this downtime can even be prohibitive.

FIG. 2 provides a chart that illustrates this variation in the timing of actuation of a component or components of a sod harvester. For this example, it will assumed that the components are the hooks (or other similar structure) of a stacking head. At time 0, it is assumed that the sod harvester has not been running and therefore its hydraulic fluid is cold. As a result, the timing of actuation of the hooks is maximized. In other words, the time between sending the command to the valve that controls the hooks and the movement of the hooks into their actuated position is maximized. Over time, as the hydraulic fluid that drives the actuation of the hooks warms, the timing of actuation decreases until a steady temperature is reached as indicated by the initial downward curve in the chart.

It is then assumed that harvesting is paused for some reason. As a result, the temperature of the hydraulic fluid will decrease until harvesting is resumed. This decrease in temperature can occur relatively quickly in colder environments. As a result of this decrease in the temperature, once harvesting is resumed, the timing of actuation will have increased. As harvesting proceeds, the temperature will again increase causing the timing of actuation to decrease until a steady temperature and therefore a consistent timing of actuation has been reached. As a result, there will be a period of variation in the timing of actuation whenever the temperature of the hydraulic fluid is below its steady state temperature.

Given the criticality of timing of these various components of the sod harvester, which becomes even more critical as the rate of harvesting increases, the operator may choose to run the harvester without actually harvesting sod during this period of variation which results in lost harvesting time. For example, any time harvesting is paused (even for relatively short amounts of time in cold environments), the operator may have to wait a few minutes before resuming. Alternatively, the operator may attempt to harvest sod during this period of variation which will likely result in a poorly formed pallet, discharged slabs, and/or damage to the sod harvester. In any case, these periods of variation significantly limit the performance of a sod harvester.

BRIEF SUMMARY

The present invention extends to sod harvesters having hydraulic systems that are configured to actuate components with precise timing. The hydraulic system of a sod harvester can be configured to maintain the temperature of hydraulic fluid both during harvesting and while harvesting is paused to thereby eliminate or minimize the occurrence of periods of variation in the timing of actuation of the components that the hydraulic fluid drives. As a result, these components can be consistently actuated with precise timing even after harvesting has been paused. Additionally, such configurations can minimize the amount of time required to warm the hydraulic fluid to a steady operational temperature. The present invention therefore enables sod to be harvested efficiently and with precision at very fast rates.

In one embodiment, the present invention is implemented as a sod harvester that includes a cutting head for cutting sod from the ground, a stacking conveyor configured to receive the sod, a stacking head configured to remove the sod from the stacking conveyor for stacking, and a hydraulic system for controlling at least one hydraulically actuated component of the sod harvester. The hydraulic system includes: a pump; an actuator for each hydraulically actuated component, each actuator being configured to actuate the corresponding hydraulically actuated component; a first hydraulic line coupled to one end of each actuator; a second hydraulic line connected to an opposite end of each actuator; a control valve for coupling either the first or the second hydraulic line to the pump; and a bypass valve coupled between the first and second hydraulic lines to thereby allow hydraulic fluid to flow between the first and second hydraulic lines.

In another embodiment, the present invention is implemented as a sod harvester hydraulic system that includes: a hydraulic actuator that is coupled to a hydraulically actuated component; a hydraulic pump; a control valve; a first and a second hydraulic line that are coupled to opposite ends of the hydraulic actuator and to the control valve, the control valve selectively coupling either the first or the second hydraulic line to the hydraulic pump; and a bypass valve that is connected between the first and the second hydraulic lines to thereby allow hydraulic fluid to flow between the first and second hydraulic lines.

In another embodiment, the present invention is implemented as a sod harvester that includes a stacking head configured to pick up sod for stacking, the stacking head including a sod securing component and a hydraulic system for controlling the sod securing component. The hydraulic system includes: a pump; an actuator configured to actuate the sod securing component; a first hydraulic line coupled to one end of the actuator; a second hydraulic line connected to an opposite end of the actuator; a control valve for coupling either the first or the second hydraulic line to the pump; and a bypass valve coupled between the first and second hydraulic lines to thereby allow hydraulic fluid to flow between the first and second hydraulic lines.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

In this specification, a stacking head should be construed as the mechanism of a sod harvester that picks up sod and stacks it, whether the sod is in slabs or in rolls. A sod securing component should be construed as a hydraulically actuated component of a stacking head that secures the sod to allow it to be picked up by the stacking head. Examples of sod securing components include hooks, spikes, clamps, etc. A stacking head adjusting component should be construed as a hydraulically actuated component of the stacking head that causes the stacking head to descend towards a stacking conveyor as part of removing sod from the stacking conveyor.

A stacking conveyor should be construed as a conveyor of a sod harvester on which sod is positioned when it is picked up for stacking by a stacking head. A stacking conveyor adjusting component should be construed as a hydraulically actuated component of the stacking conveyor that alters the position of sod on the stacking conveyor (e.g., by lifting the sod) in conjunction with the stacking head removing the sod from the stacking conveyor. A stacking conveyor adjusting component may therefore be a component that lifts the entire stacking conveyor, a component of the stacking conveyor that lifts sod from another component of the stacking conveyor, a component of the stacking conveyor that alters the shape of the stacking conveyor, etc.

A chopping blade should be construed as a hydraulically actuated blade of a sod harvester that is configured to be periodically thrust into the soil as the sod harvester travels to thereby create separate slabs of sod. An actuator should be construed as either a linear actuator (e.g., a hydraulic cylinder) or a rotary actuator (e.g., a hydraulic motor). An actuator will be described as having opposing ends which should be construed as the ports through which hydraulic fluid flows to actuate the actuator.

Figure 3:
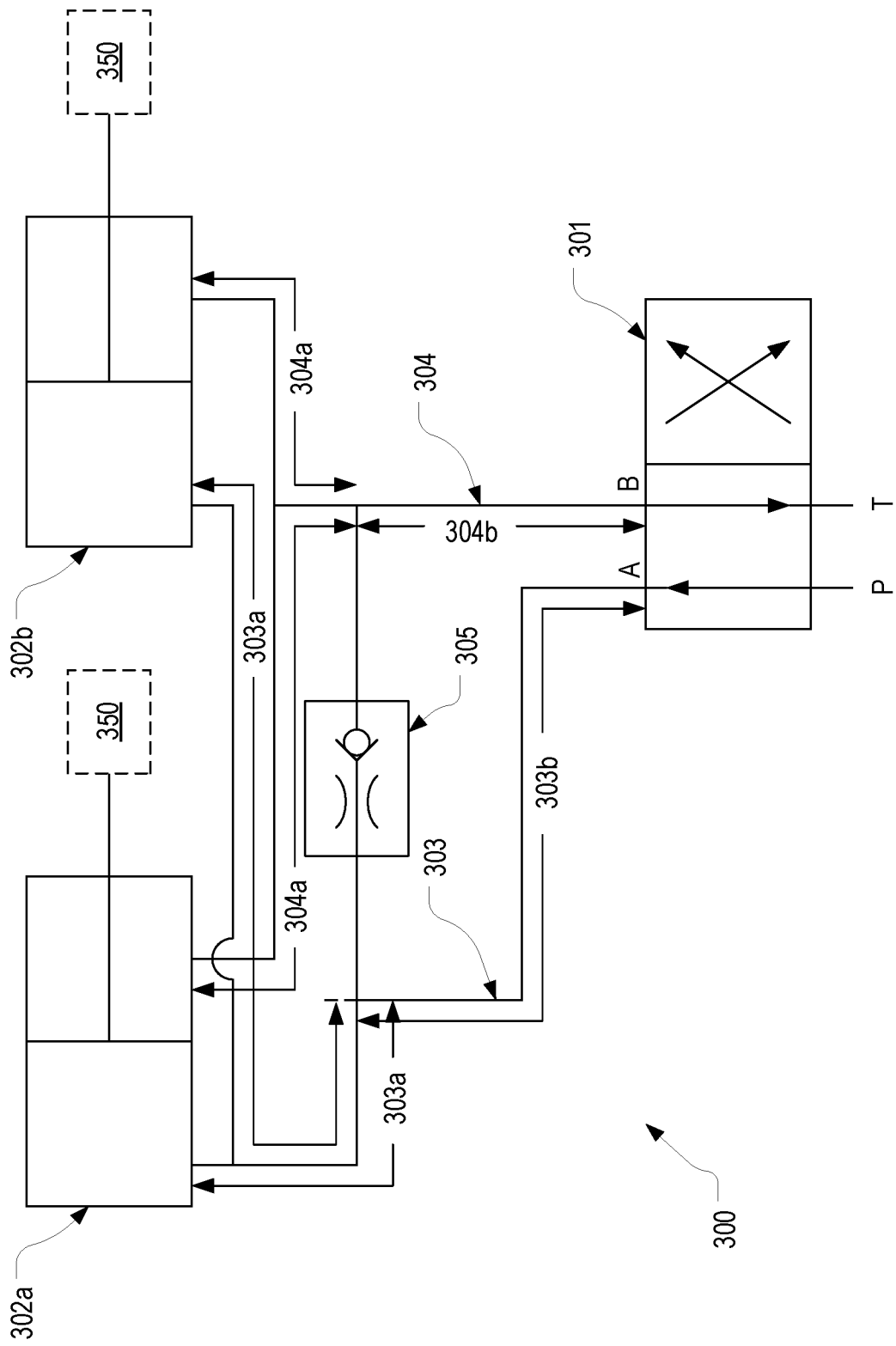
FIG. 3 illustrates a hydraulic system of a sod harvester that is configured to compensate for variations in the temperature of the hydraulic fluid in accordance with the present invention.

FIG. 3 illustrates a hydraulic system 300 of a sod harvester that is configured in accordance with embodiments of the present invention. Hydraulic system 300 includes a control value 301 that is fluidly coupled to one or more actuators 302a, 302b via hydraulic lines 303, 304. Actuators 302a, 302b are each coupled to a hydraulically actuated component 350 which may be any of the various types of hydraulically actuated components described above. For purposes of illustration only, it will be assumed in the following description that hydraulically actuated components 350 represent hooks 150. In such a case, actuators 302a, 302b can be equated with actuators 102a, 102b. Although the figures generally depict actuators that are cylinders, the actuators may equally be rotary motors as mentioned above. For example, a stacking conveyor that is lifted or a chopping blade may oftentimes employ a rotary motor rather than a cylinder as the actuator.

Figure 1:
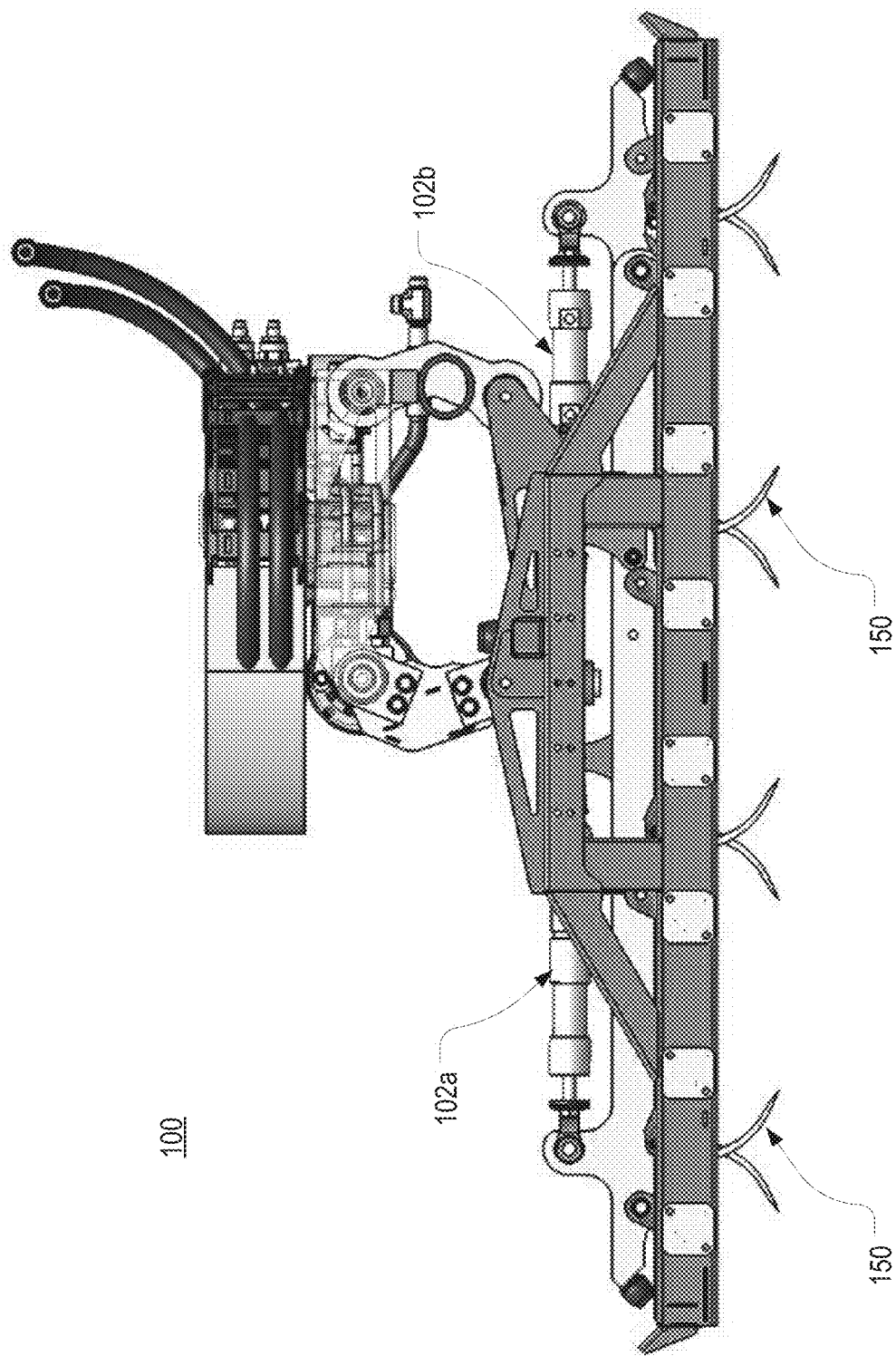
FIG. 1 illustrates an example of a stacking head of a sod harvester that includes hydraulically actuated components.

In the depicted example where actuators 302a, 302b are cylinders, it will also be assumed that when control valve 301 is in the depicted position, the pistons of actuators 302a, 302b (or of actuators 102a, 102b) will be in an extended position which causes hooks 150 to be retracted (opposite of what is shown in FIG. 1). On the other hand, when control valve 301 is in the opposite position (i.e., when the P port is connected to the B port), the pistons will be in a retracted position which causes hooks 150 to be in the extended position (as shown in FIG. 1). The switching of control valve 301 therefore causes hooks 150 to be actuated. It is noted that this configuration could equally be reversed (i.e., hooks 150 could be extended when control valve 301 is in the depicted position).

As can be seen, as control valve 301 is toggled between the two positions, an amount of hydraulic fluid will pass through control valve 301. This amount is related substantially to the volume of actuators 302a, 302b. In some sod harvester configurations, the length of hydraulic lines 303, 304 is relatively long (e.g., up to 25 feet, at least 3 feet, etc.) such that the volume of the hydraulic fluid in hydraulic lines 303, 304 is significant relative to the total volume of hydraulic fluid. As a result, the relatively small amount of hydraulic fluid that fills the actuator will repeatedly pass into and out of hydraulic lines 303 and 304 without substantially passing through control valve 301. In FIG. 3, hydraulic line 303 is identified as having a first portion 303a that extends between actuator 102a/102b and bypass valve 305 and a second portion 303b that extends between bypass valve 305 and control valve 301. Similarly, hydraulic line 304 is identified as having a first portion 304a that extends between actuator 102a/102b and bypass valve 305 and a second portion 304b that extends between bypass valve 305 and control valve 301. In some embodiments, each second portion 303b, 304b may be longer than the respective first portion 303a, 304a.

Figure 2:
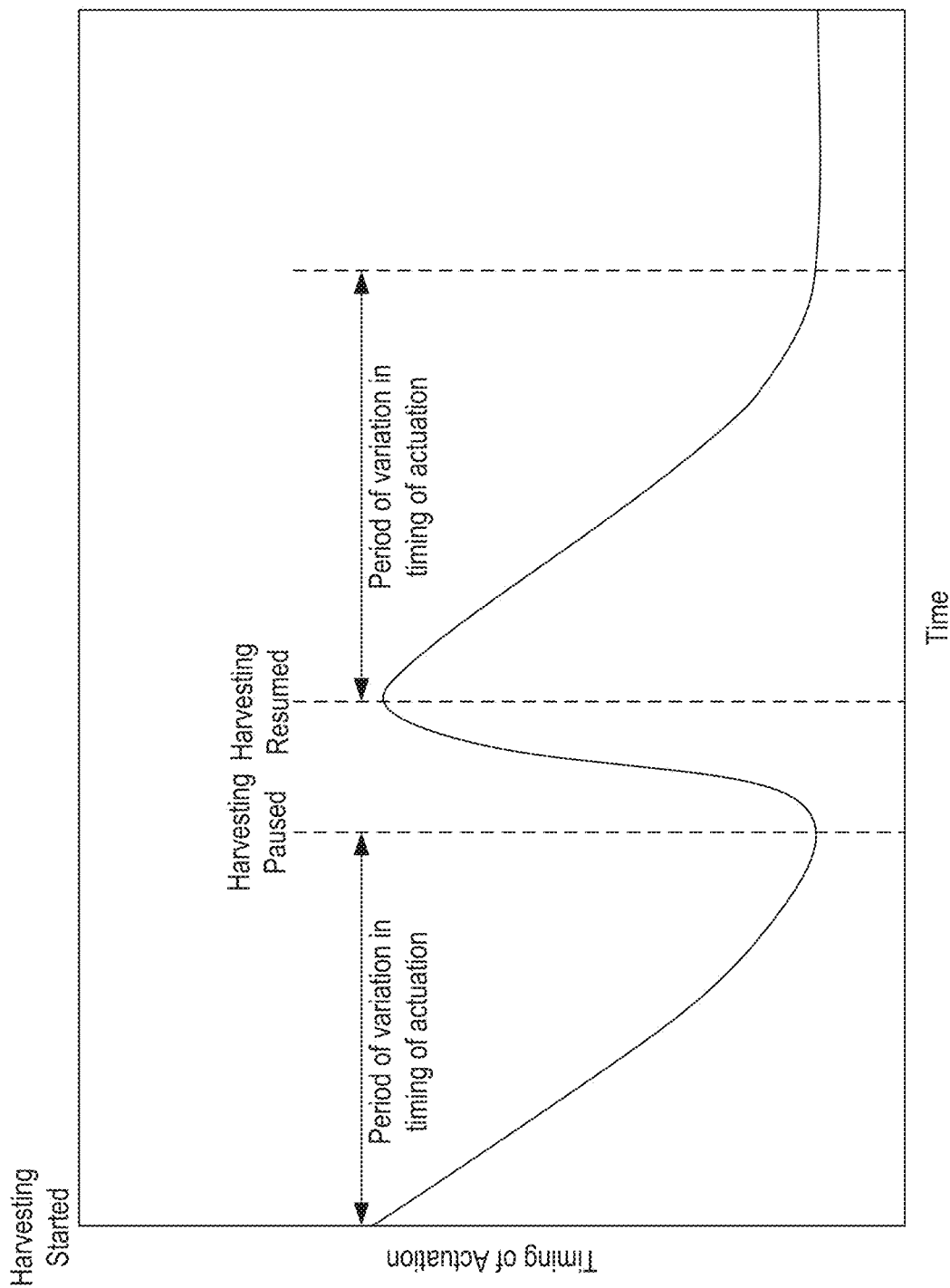
FIG. 2 provides a chart that illustrates how the timing of actuation of sod harvester components can vary based on the temperature of the hydraulic fluid that actuates the components.

As mentioned in the background, the hydraulic fluid will heat during operation of hydraulic system 300. The primary source of this heat is oftentimes friction within control valve 301. Given that a relatively small amount of hydraulic fluid passes through control valve 301, the heating due to friction within the control valve will remain somewhat localized to the control valve. In short, it can take a relatively long time for the hydraulic fluid to heat up throughout hydraulic system 300 and particularly within actuators 302a, 302b. As a result, the amount of time it takes for the timing of actuation of actuators 302a, 302b to reach a steady state can be considerable as is represented in the chart of FIG. 2.

To address these issues, hydraulic system 300 also includes a bypass valve 305 that is fluidly coupled between hydraulic line 303 and hydraulic line 304. In other words, in the depicted configuration, bypass valve 305 fluidly connects the hydraulic line that is coupled to the pump port to the hydraulic line that is coupled to the tank port. Bypass valve 305 includes a check valve that permits flow of hydraulic fluid in only one direction which in this case is from hydraulic line 303 to hydraulic line 304. Bypass valve 305 also includes a throttle valve which limits the amount of hydraulic fluid that can flow through bypass valve 305. In some embodiments, the throttle valve can be configured to allow up to a gallon of hydraulic fluid per minute to pass through bypass valve 305. In some embodiments, the throttle valve can be configured to allow less than ten gallons of hydraulic fluid per minute to pass through bypass valve 305.

In hydraulic system 300, when control valve 301 is positioned to connect port A to port P, hydraulically actuated component 350 will be in an unactuated position. In this state, which can represent the state of the hydraulically actuated components when sod is not being harvested (as well as the state between actuations during harvesting), bypass valve 305 will still allow hydraulic fluid to flow through control valve 301 and through a substantial length of hydraulic lines 303, 304 thereby heating the hydraulic fluid. Therefore, even though the sod harvester may be in an idle state, the hydraulic fluid will still be heated and distributed throughout much of hydraulic system 300. As a result, the amount of time it takes for cold hydraulic fluid to reach a steady operational temperature is greatly reduced. Furthermore, once the hydraulic fluid is heated, the continuous circulation of the hydraulic fluid through bypass valve 305 will prevent the fluid from cooling even if harvesting is paused. The only time that hydraulic fluid will not flow through bypass valve 305 is during the short interval when control valve 301 is toggled to actuate component 350.

To maximize the amount of hydraulic fluid that is circulated, bypass valve 305 can preferable be positioned close to actuators 302a, 302b (i.e., as far away from control valve 301 as is reasonable). As mentioned above, in some sod harvester configurations, the distance between control valve 301 and bypass valve 305 may be substantial such as greater than 20 feet.

In some embodiments, bypass valve 305 could be configured as an active or a passive valve. For example, an active bypass valve can be configured to be turned on or off to thereby allow control over whether hydraulic fluid will flow through bypass valve 305. Also, in some embodiments, the throttle valve within bypass valve 305 can be configured as either a static or variable throttle valve. A variable throttle valve may be desirable when a sod harvester will be used in variable environmental conditions to thereby allow greater or lesser amounts of hydraulic fluid to flow through bypass valve 305. For example, if a sod harvester will sometimes be operated in cold conditions, it may be desirable to employ a variable throttle valve so that more hydraulic fluid can be routed through bypass valve 305 to more quickly increase and/or maintain the temperature of the hydraulic fluid during cold weather harvesting.

Figure 3A:
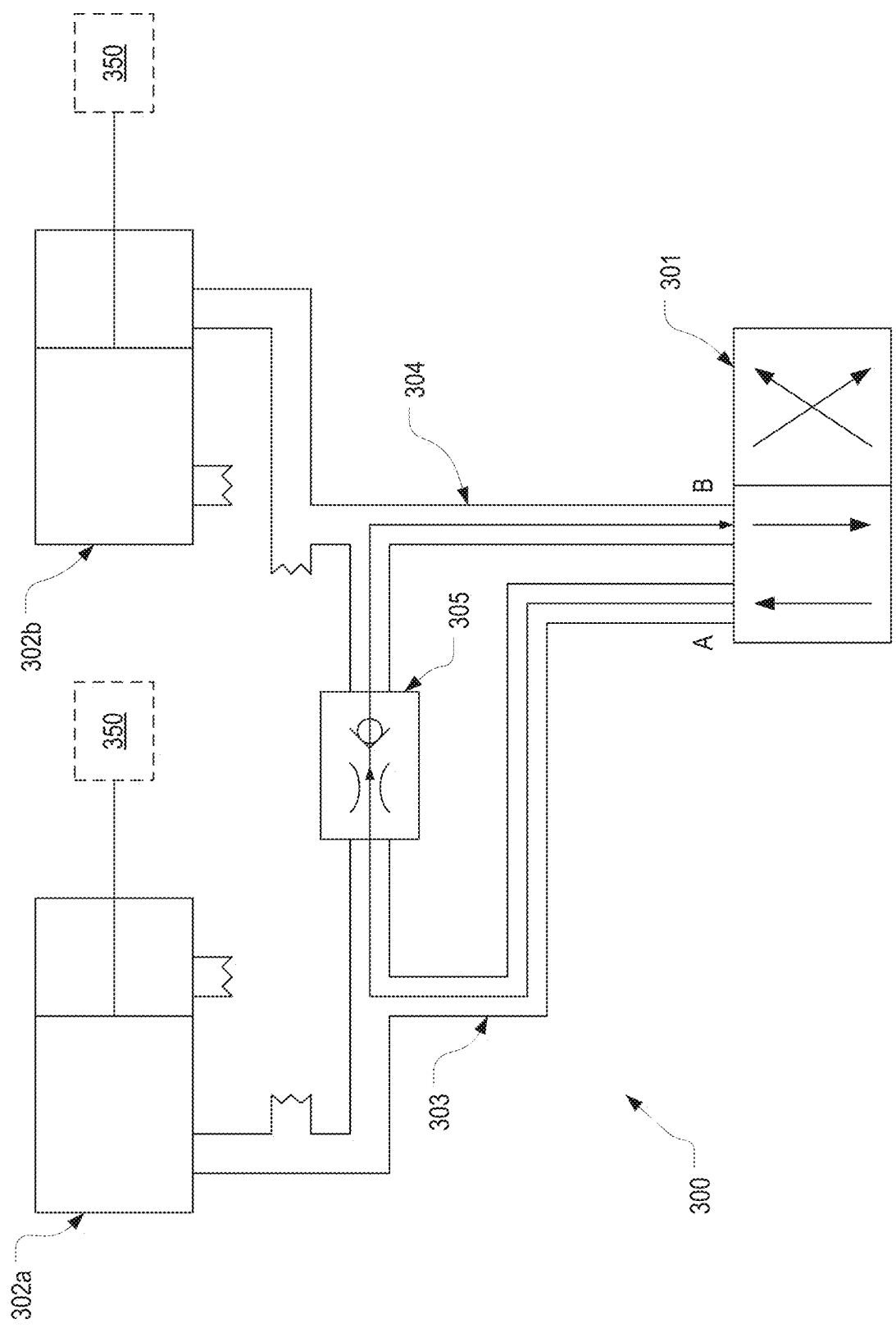
FIGS. 3A-3C illustrates how the hydraulic system of FIG. 3 enables a component to be actuated with precise timing.
Figure 3B:
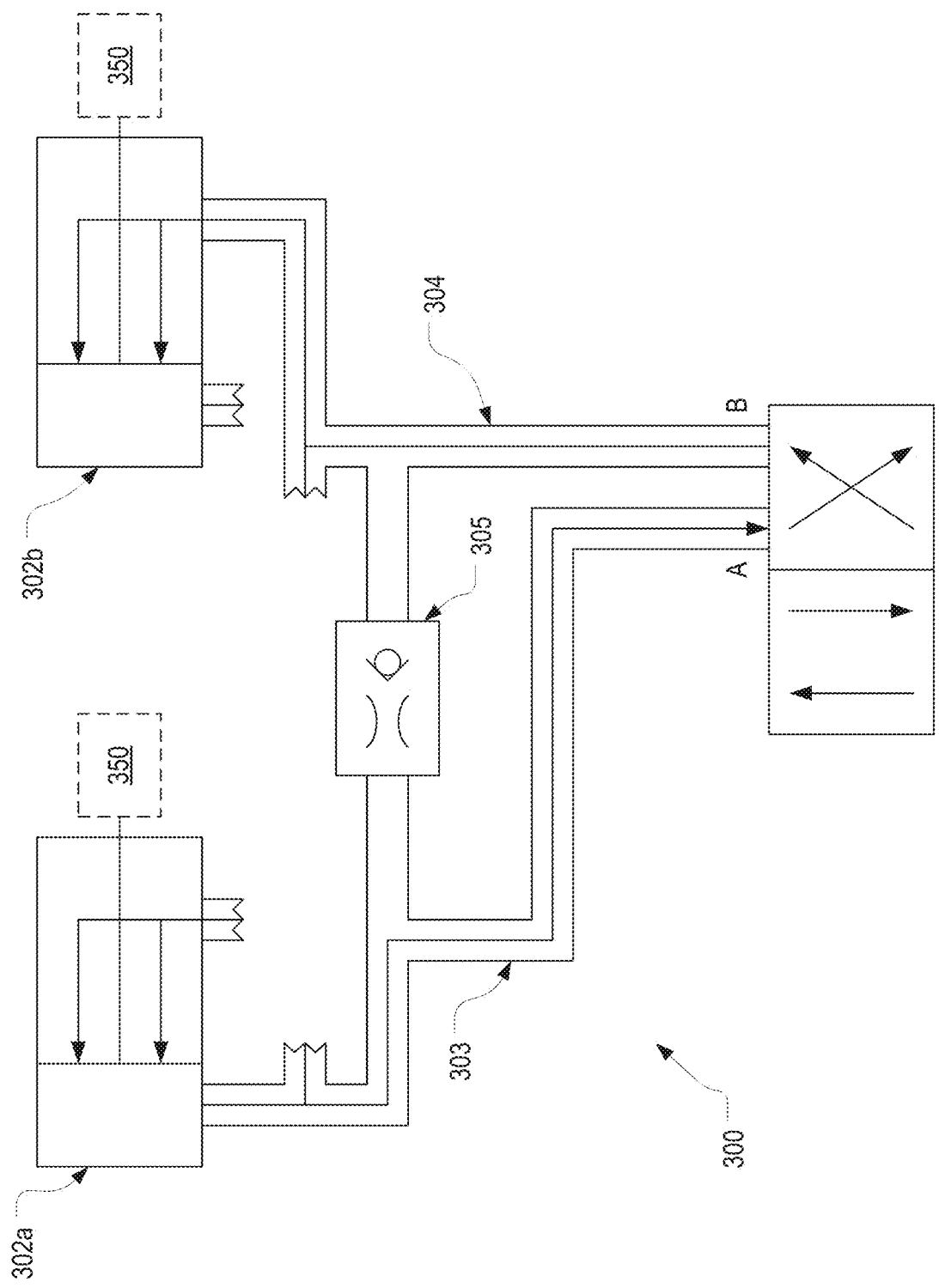
Figure 3C:
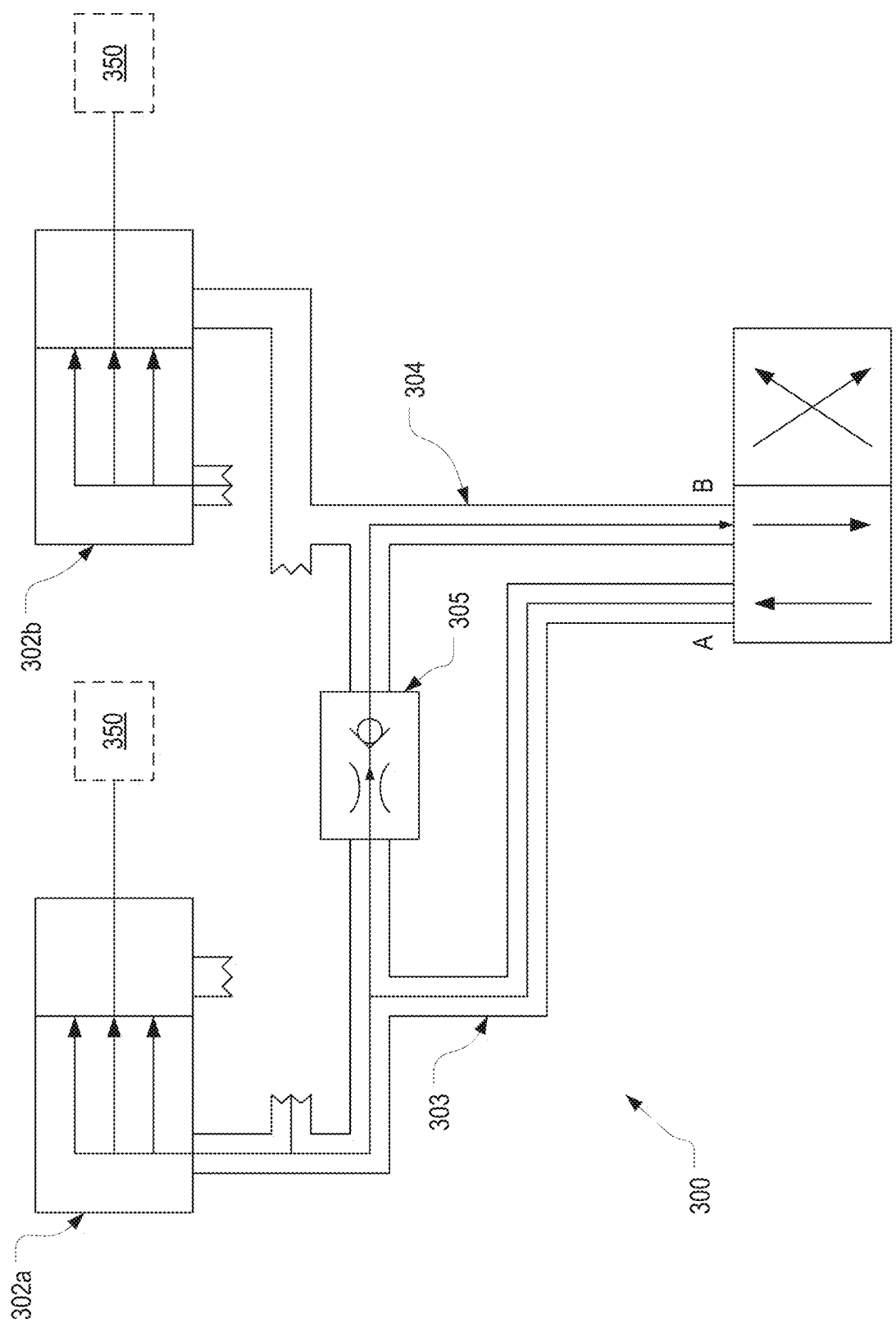

FIGS. 3A-3C illustrate how bypass valve 305 minimizes and/or eliminates periods of variation in the timing of actuation of components 350. These figures can also generally represent how bypass valve 305 reduces the amount of time required to warm the hydraulic fluid to a steady operational temperature when a sod harvester is initially started.

FIG. 3A represents the state of hydraulic system 300 when harvesting is not being performed such as may be the case when a sod harvester is initially started or when harvesting is paused while the sod harvester is still running (i.e., when the engine is still running and is therefore powering the pump of the hydraulic system). For example, FIG. 3A can represent when a sod securing component, a stacking head adjusting component, a stacking conveyor adjusting component, a chopping blade, or some other hydraulically actuated component of a sod harvester is not being actuated. In this state, and assuming control valve 301 is positioned to couple port P to port A (or at least to couple port P to whatever port is coupled to the upstream side of bypass valve 305), the pressure of the hydraulic fluid in hydraulic line 303 will be increased relative to the pressure of the hydraulic fluid in hydraulic line 304 thereby causing the hydraulic fluid to flow through bypass valve 305. As indicated above, the throttle valve within bypass valve 305 can restrict the flow of hydraulic fluid through bypass valve 305 to a relatively small amount (e.g., less than a gallon per minute) so as to have an insignificant impact on the overall pressure of the hydraulic fluid within hydraulic line 303 and to minimize power consumption.

Although the amount of hydraulic fluid that flows through bypass valve 305 may be relatively small in comparison to the overall volume of the hydraulic fluid, this flow will ensure that hydraulic fluid is continuously flowing through control valve 301 and through a substantial length of hydraulic lines 303, 304 which will result in heating of the hydraulic fluid. Furthermore, this flow will also distribute the heated hydraulic fluid towards actuators 302a, 302b such that the hydraulic fluid within actuators 302a, 302b may be quickly heated (if it was not previously heated) or may maintain its temperature. The warmer hydraulic fluid will have a lower viscosity which in turn reduces the timing of actuation as described above.

Figure 5:
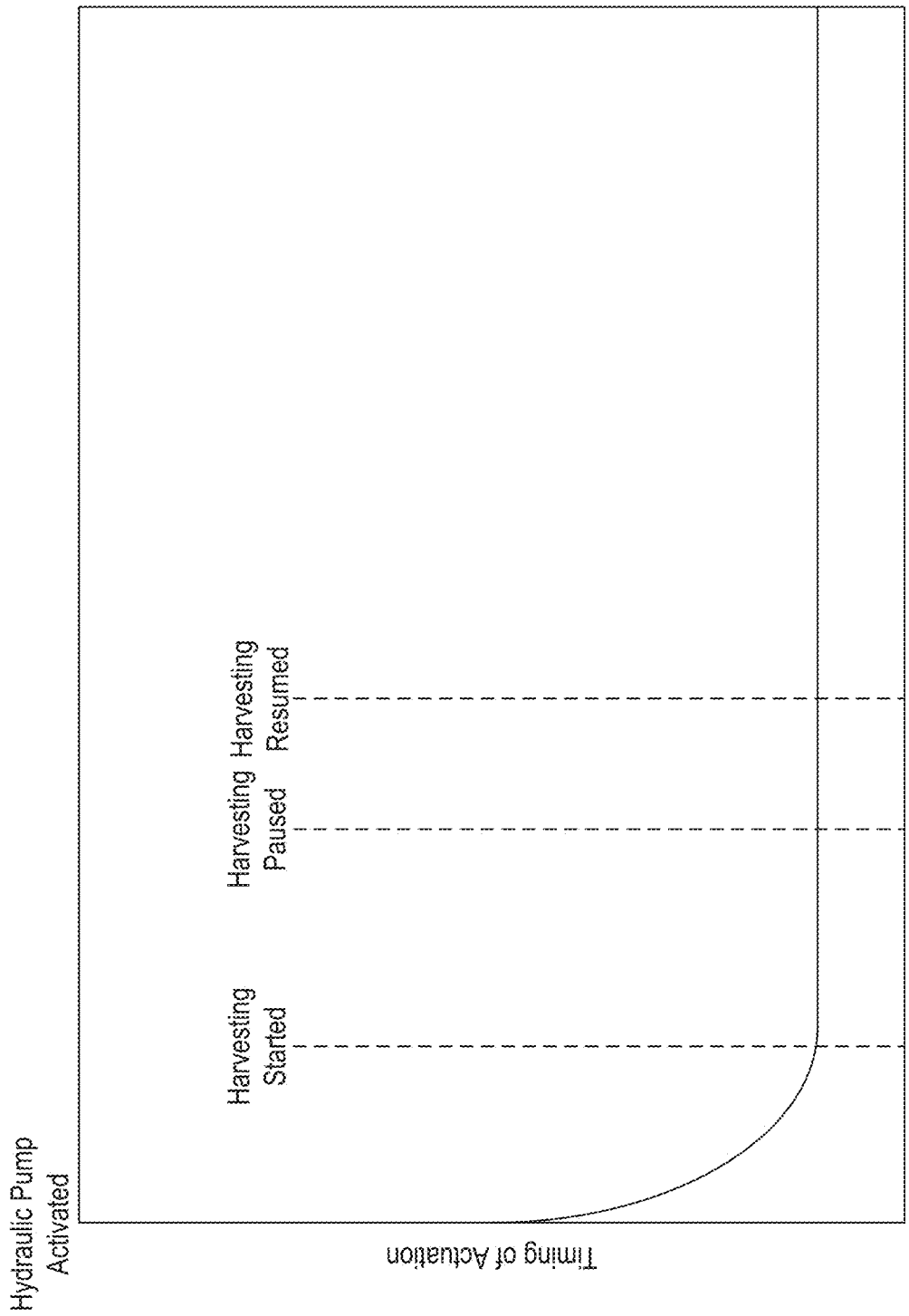
FIG. 5 provides a chart that illustrates how the timing of actuation of sod harvester components can be maintained constant using the techniques of the present invention.

Accordingly, even though harvesting is not occurring, the hydraulic fluid will be quickly warmed due to the inclusion of bypass valve 305. FIG. 5 provides a chart that represents a timing of actuation that may occur in a sod harvester that employs hydraulic system 300. In FIG. 5, it will be assumed that the sod harvester was not initially running and therefore the hydraulic fluid was at ambient temperature. When the hydraulic pump is activated (which would typically occur when the sod harvester is started), the temperature of the hydraulic fluid will immediately begin to increase due to the flow that bypass valve 305 enables. As a result, the timing of actuation will immediately begin to decrease. It is important to note that this decrease in the timing occurs once the hydraulic pump is activated as opposed to once harvesting is started as was the case in FIG. 2. As shown, the timing of actuation will quickly drop to a constant level. Harvesting with precise timing can therefore be started much more quickly.

Returning now to FIG. 3B, the state of hydraulic system 300 during the actuation of components 350 is shown. Although control valve 301 is not included in FIG. 3B, this state would be reached by toggling control valve 301 to cause port P to be coupled to port B. In this state, the pressure of the hydraulic fluid in hydraulic line 304 would be increased relative to the pressure of the hydraulic fluid in hydraulic line 303 which, in this example configuration, will cause the pistons within actuators 302a, 302b to be retracted. As mentioned above, this retraction of the pistons could cause hooks 150 to be extended to secure and remove sod from a stacking conveyor. It is again noted that whether extension or retraction of the pistons causes the actuation is entirely arbitrary.

During actuation, and due to the check valve within bypass valve 305, hydraulic fluid will not flow through bypass valve 305. Bypass valve 305 will therefore not impact the actuation. In other words, because there is no flow through bypass valve 305 during actuation, the full pressure of the hydraulic fluid will be delivered to actuators 302a, 302b.

Turning now to FIG. 3C, the state of hydraulic system 300 after actuation is shown. This state would be reached upon toggling control valve 301 back to its "default" position as shown in FIG. 3. Upon toggling control valve 301, the pressure of the hydraulic fluid in hydraulic line 303 will again be greater than the pressure of the hydraulic fluid in hydraulic line 304 thereby causing the pistons to return to their extended position and also causing the flow of hydraulic fluid through bypass valve 305 to resume.

In typical operation, hydraulic system 300 would toggle quickly between the states shown in FIGS. 3B and 3C. For example, a sod harvester may actuate hooks 150 (by toggling to the state in 3C) long enough to pick up sod, transport it to a pallet, and then drop it (by toggling to the state of FIG. 3C). As this process is repeated, there will be periodic flow of hydraulic fluid through bypass valve 305 as well as the flow that would normally result from toggling control valve 301. This additional flow through bypass valve 305 during harvesting can be beneficial in some operating conditions. For example, when harvesting is performed in cold environments, the normal flow of hydraulic fluid through control valve 301 may be insufficient to cause the hydraulic fluid in actuators 302a, 302b to be heated to a desirable temperature (e.g., the heating that occurs primarily at control valve 301 would likely dissipate before reaching actuators 302a, 302b). However, with bypass valve 305, this heating would be better distributed during harvesting in cold environments. It is noted, however, that in some embodiments, bypass valve 305 may be configured to allow it to be turned off during harvesting.

If harvesting is paused, hydraulic system 300 will remain in the state shown in FIG. 3A for a relatively long period of time. As addressed in the background, in prior art systems, during this period when harvesting is paused, the hydraulic fluid would cool and the timing of actuation would increase as shown in FIG. 2 thereby resulting in a period of variation in the timing of actuation once harvesting is resumed. In contrast, in hydraulic system 300, hydraulic fluid will continue to flow through bypass valve 305 thereby preventing the hydraulic fluid from cooling and maintaining the timing of actuation at the constant level. Accordingly, after a pause in harvesting, there will be no period of variation in the timing of actuation once harvesting is resumed as is shown in FIG. 5.

By eliminating (or at least minimizing) periods of variation in the timing of actuation, the present invention allows harvesting to be performed more efficiently and precisely even at high rates and in cold environments. More specifically, although there may be a short period of time during which the hydraulic fluid will need to be warmed to a steady operational state, due to the present invention, there may be no other periods of time during which variations in the temperature of the hydraulic fluid will cause variations in the timing of actuation. In short, the present invention eliminates periods of time during which prior art sod harvesters could not be used to effectively harvest sod.

Figure 4:
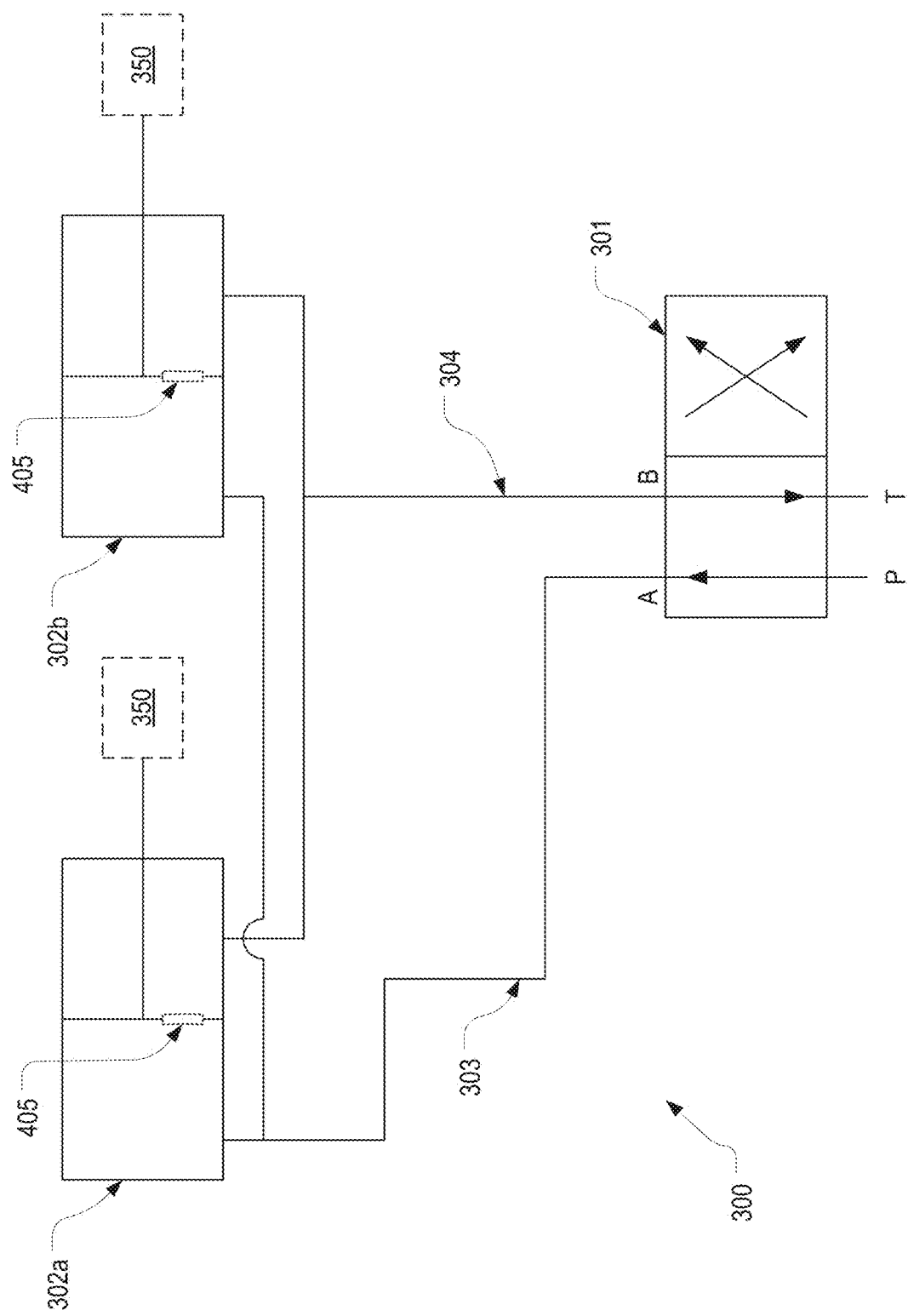
FIG. 4 illustrates another hydraulic system of a sod harvester that is configured to compensate for variations in the temperature of the hydraulic fluid in accordance with the present invention.

FIG. 4 illustrates a variation in the configuration of hydraulic system 300. In FIG. 4, bypass valve 305 has been replaced by separate bypass valves 405 that are incorporated directly into the pistons of actuators 302a, 302b. Although this configuration is structurally different than the configuration shown in FIG. 3, its functionality is the same. In the case of a rotary motor, a similarly configured bypass valve could be incorporated into the body of the rotary motor. One benefit of incorporating the bypass valve directly within the piston or motor body is that it causes the flow of hydraulic fluid to extend around the entire hydraulic system. In other words, in the configuration shown in FIG. 4, hydraulic fluid will flow through actuators 302a, 302b thereby ensuring that heated hydraulic fluid will exist within the actuators even in harsh environment conditions.

In summary, hydraulic system 300 provides a way to quickly distribute heat throughout the hydraulic fluid and to maintain the heat even when harvesting is paused. By maintaining a constant operational temperature of the hydraulic fluid, including the hydraulic fluid within the actuators that are likely positioned a relatively long distance from the control valve, hydraulic system 300 ensures that a constant timing of actuation is provided. This constant timing of actuation allows the components of the sod harvester to be actuated with precision even at high rates of harvesting.

Figure 6:
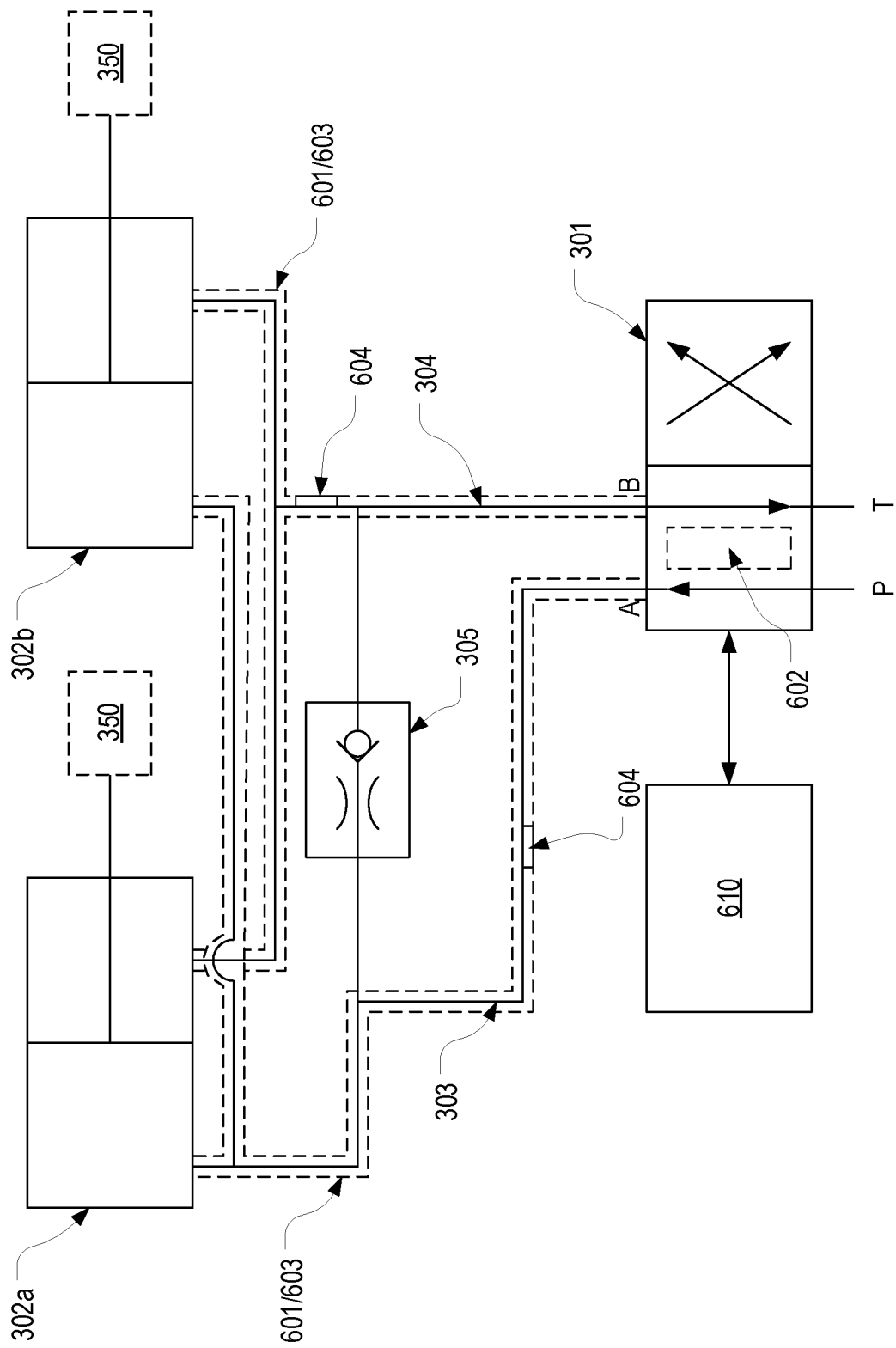
FIG. 6 illustrates how the hydraulic system of FIG. 3 can include additional components.
Figure 7:
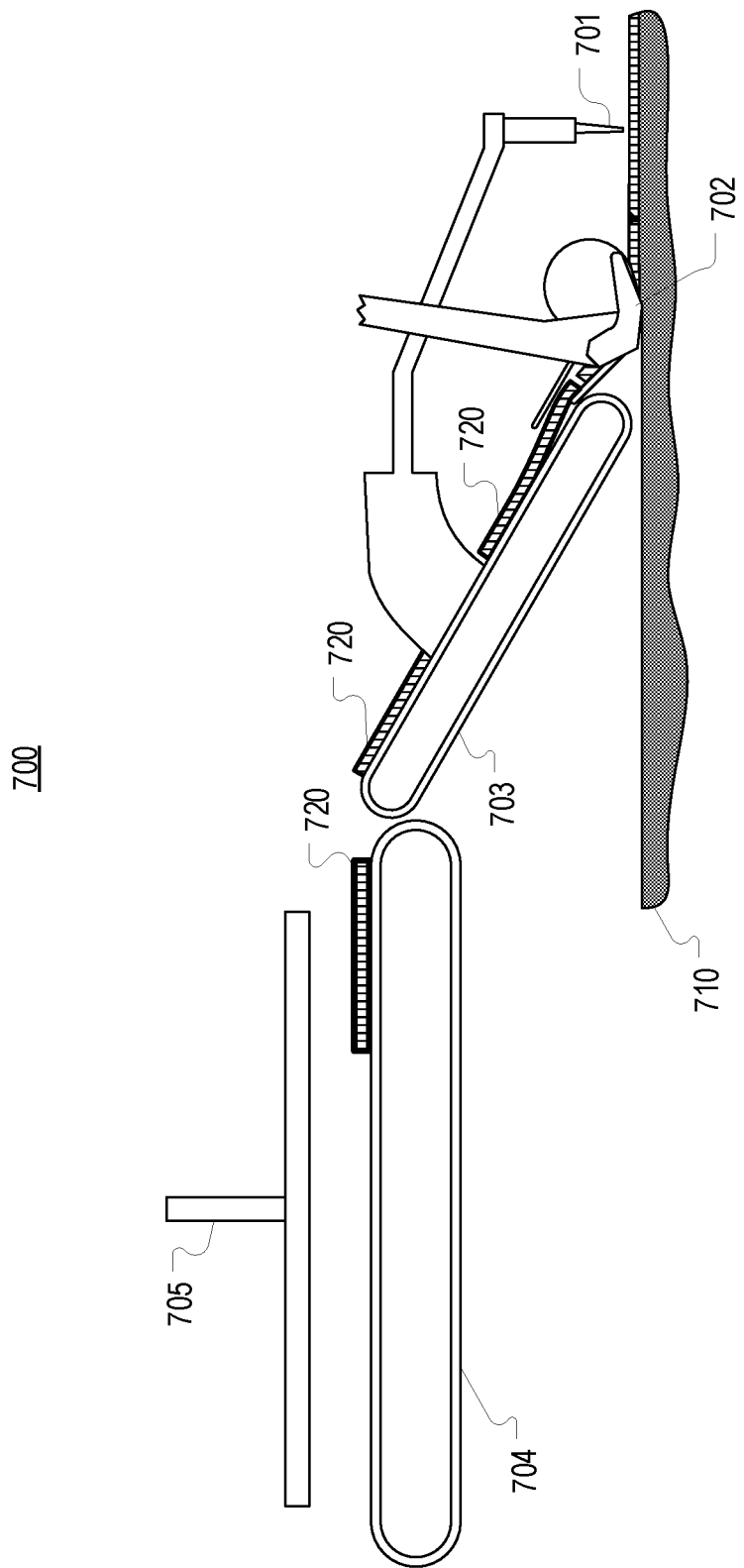
FIG. 7 provides an example of components that may exist on a sod harvester.
Figure 8:
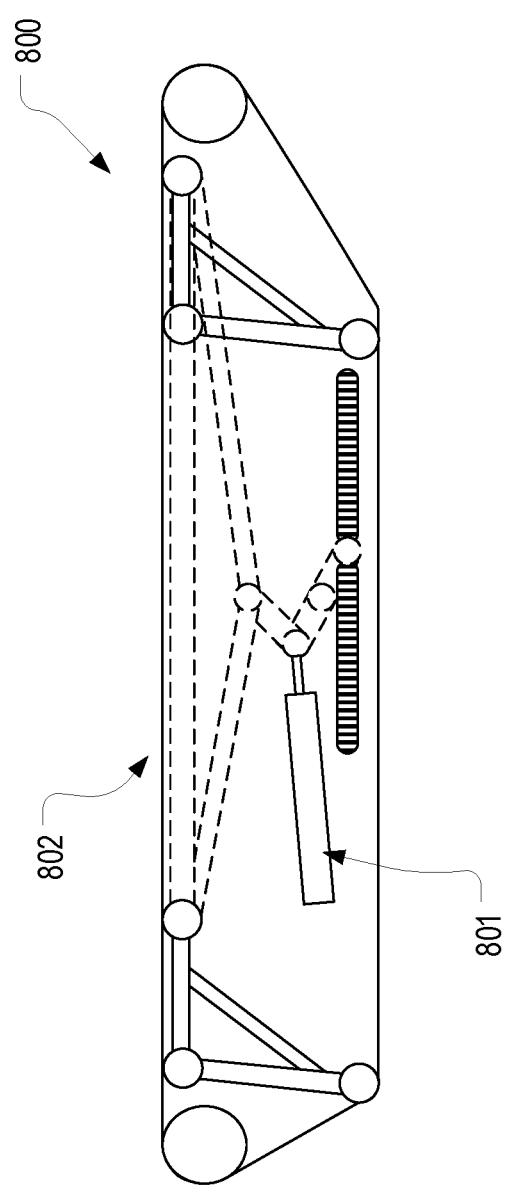
FIG. 8 provides an example of how a stacking conveyor of a sod harvester may include a stacking conveyor adjusting component.

In addition to or in place of the techniques described above, various other techniques can be employed to address the variability in the temperature of the hydraulic fluid. For example, FIG. 6 shows that insulation 601 could be added to the hydraulic lines between the control valve and the actuator(s) (e.g., to hydraulic lines 303, 304). Alternatively or additionally, the temperature of the hydraulic fluid could be actively maintained by heating and/or cooling the control valve and/or the hydraulic lines. For example, a heating element 602 could be added to control valve 301 and/or heating elements 603 could be added to hydraulic lines 303, 304 (e.g., by incorporating heating elements 603 that extend along the length of the hydraulic lines). In such cases, one or more sensors 604 may be employed to detect the current temperature of the hydraulic fluid and to activate heating elements 602/603 accordingly.

Rather than (or in addition to) maintaining/controlling the temperature of the hydraulic fluid, a sod harvester could be configured to compensate for variations in the temperature of the hydraulic fluid. For example, sensors 604 could be employed to detect the current temperature of the hydraulic fluid and to report this current temperature to a control system 610 (e.g., a control system that controls when control valve 301 is toggled). Based on the reported temperature, control system 610 could control the timing of actuation so that the hydraulically actuated component's movement occurs with precise timing. For example, control system 610 can maintain mappings between temperatures and delays so that the toggling of control valve 301 can occur at a timing that is based on the delay that the current temperature of the hydraulic fluid will cause. With reference to FIGS. 2 and 5, this compensation technique could be employed to vary the timing of the toggling of control valve 301 during the period of variation in the timing of actuation. In particular, when the hydraulic fluid is cooler (and therefore when there is a longer delay), control system 610 could be configured to toggle control valve 301 sooner than when the hydraulic fluid is warmer (relative to when the actual movement of the component is desired to occur). As suggested, such compensation techniques could be performed alone or in conjunction with any of the above described techniques for maintaining/controlling the temperature of the hydraulic fluid.

By performing any one or more of these techniques, a sod harvester can be operated with more precise timing and at faster rates than would otherwise be possible. The present invention can therefore enhance the efficiency of harvesting sod.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for actuating a hydraulically actuated component of a sod harvester with precise timing, the method comprising:

providing a sod harvester comprising:
  a cutting head for cutting sod from the ground;
  a stacking conveyor configured to receive the sod;
  a stacking head configured to remove the sod from the stacking conveyor for stacking; and
  a hydraulic system for controlling a hydraulically actuated component of the sod harvester, the hydraulically actuated component comprising one of a sod securing component, a stacking head adjustment component, a stacking conveyor adjusting component or a chopping blade, the hydraulic system including:
    a pump for causing hydraulic fluid to flow within the hydraulic system;
    an actuator for the hydraulically actuated component, the actuator being configured to actuate the hydraulically actuated component;
    a first hydraulic line that extends between a first end of the actuator and a single control valve;
    a second hydraulic line that extends between a second end of the actuator and the single control valve;
    the single control valve for selectively coupling either the first or the second hydraulic line to the pump such that when the single control valve couples the first hydraulic line to the pump, the hydraulic fluid flows from the first hydraulic line into the first end of the actuator which in turn causes the hydraulic fluid to flow out of the second end of the actuator and into the second hydraulic line, whereas when the single control valve couples the second hydraulic line to the pump, the hydraulic fluid flows from the second hydraulic line into the second end of the actuator which in turn causes the hydraulic fluid to flow out of the first end of the actuator and into the first hydraulic line; and
    a bypass valve coupled between the first and second hydraulic lines between the actuator and the single control valve to thereby allow the hydraulic fluid to circulate through the pump, the single control valve, the first hydraulic line, the bypass valve and the second hydraulic line; and prior to actuating the actuator for the hydraulically actuated component, causing the hydraulic fluid to flow through the bypass valve to thereby heat the hydraulic fluid such that, when actuated, the actuator for the hydraulically actuated component is actuated with precise timing.

2. The method of claim 1, wherein the bypass valve includes a throttle valve and a check valve.

3. The method of claim 1, wherein the bypass valve is external to the actuator for the hydraulically actuated component.

4. The method of claim 1, wherein the bypass valve is internal to the actuator.

5. The method of claim 4, wherein the hydraulic system includes a second hydraulically actuated component, a second actuator for the second hydraulically actuated component and a second bypass valve coupled between the first and second hydraulic lines, the second bypass valve being internal to the second actuator.

6. The method of claim 4, wherein the actuator is either a cylinder or a rotary motor, and the bypass valve is contained within a piston of the cylinder or a body of the rotary motor.

7. The method of claim 1, wherein the bypass valve includes a throttle valve that permits the hydraulic fluid to circulate at a rate of less than ten gallons per minute.

8. The method of claim 1, wherein a length of a portion of each of the first and second hydraulic lines that extends between the single control valve and the bypass valve is greater than three feet.

9. The method of claim 1, wherein a fluid volume of either the first or the second hydraulic line exceeds a total volume of hydraulic fluid displaced, during actuation, by the actuator to which the first and second hydraulic lines are connected.

10. The method of claim 1, wherein the hydraulic system further comprises one or more of:
insulation around one or more of the first hydraulic line, the second hydraulic line, or the single control valve; or
a heating element that heats the hydraulic fluid in one or more of the first hydraulic line, the second hydraulic line, or the single control valve.

11. The method of claim 1, wherein the hydraulic system further comprises:
one or more sensors for detecting a current temperature of the hydraulic fluid; and
a control system for varying a timing of toggling the single control valve based on input from the one or more sensors.

12. The method of claim 1, further comprising:
after actuating the actuator for the hydraulically actuated component and between each of a plurality of subsequent actuations of the actuator for the hydraulically actuated component, causing the hydraulic fluid to flow through the bypass valve to thereby maintain the heat of the hydraulic fluid.

13. The method of claim 1, further comprising:
during the actuating of the actuator for the hydraulically actuated component, preventing the hydraulic fluid from flowing through the bypass valve.

14. A sod harvester comprising:
a cutting head for cutting sod from the ground;
a stacking conveyor configured to receive the sod;
a stacking head configured to remove the sod from the stacking conveyor for stacking; and
a hydraulic system for controlling a hydraulically actuated component of the sod harvester, the hydraulically actuated component comprising one of a sod securing component, a stacking head adjustment component, a stacking conveyor adjusting component or a chopping blade, the hydraulic system including:
a pump for causing hydraulic fluid to flow within the hydraulic system;
an actuator for the hydraulically actuated component, the actuator being configured to actuate the hydraulically actuated component;
a first hydraulic line that extends between a first end of the actuator and a single control valve;
a second hydraulic line that extends between a second end of the actuator and the single control valve;
the single control valve for selectively coupling either the first or the second hydraulic line to the pump such that when the single control valve couples the first hydraulic line to the pump, the hydraulic fluid flows from the first hydraulic line into the first end of the actuator which in turn causes the hydraulic fluid to flow out of the second end of the actuator and into the second hydraulic line, whereas when the single control valve couples the second hydraulic line to the pump, the hydraulic fluid flows from the second hydraulic line into the second end of the actuator which in turn causes the hydraulic fluid to flow out of the first end of the actuator and into the first hydraulic line; and
a bypass valve coupled between the first and second hydraulic lines between the actuator and the single control valve to thereby allow the hydraulic fluid to circulate through the pump, the single control valve, the first hydraulic line, the bypass valve and the second hydraulic line;
wherein the sod harvester is configured to actuate the hydraulically actuated component by, prior to actuating the actuator for the hydraulically actuated component, causing the hydraulic fluid to flow through the bypass valve to thereby heat the hydraulic fluid.

15. The sod harvester of claim 14, wherein the sod harvester is further configured to:
after actuating the actuator for the hydraulically actuated component and between each of a plurality of subsequent actuations of the actuator for the hydraulically actuated component, causing the hydraulic fluid to flow through the bypass valve to thereby maintain the heat of the hydraulic fluid.

16. The sod harvester of claim 14, wherein the sod harvester is further configured to:
during the actuating of the actuator for the hydraulically actuated component, preventing the hydraulic fluid from flowing through the bypass valve.

17. The sod harvester of claim 14, wherein the bypass valve includes a throttle valve and a check valve.

18. The sod harvester of claim 14, wherein the bypass valve includes a throttle valve that permits the hydraulic fluid to circulate at a rate of less than ten gallons per minute.

19. The sod harvester of claim 14, wherein the hydraulic system further comprises:
one or more sensors for detecting a current temperature of the hydraulic fluid; and
a control system for varying a timing of toggling the control valve based on input from the one or more sensors.

20. The sod harvester of claim 14, wherein the bypass valve is external to the actuator for the hydraulically actuated component.

\* \* \* \* \*